Patented Sept. 18, 1951

2,568,426

UNITED STATES PATENT OFFICE 2,568,426

CONDENSATION PRODUCTS FROM POLY-ETHYLENIC-UNSATURATED ALDEHYDE ADDUCTS, DERIVATIVES THEREOF, AND METHODS FOR PRODUCING THE SAME

Richard R. Whetstone, Orinda, William J. Raab, Berkeley, and Seaver A. Ballard, Orinda, Calif., assignors to Shell Development Company, San Francisco, Calif., a corporation of Delaware No Drawing. Application June 6, 1949, Serial No. 97,484

23 Claims. (Cl. 260—23)

This invention relates to new compositions of matter and to methods for their preparation. More particularly, the invention relates to novel condensation products prepared from adducts of unsaturated aldehydes and polyethylenic compounds, to valuable derivatives prepared therefrom, and to methods for producing the same.

Specifically, the invention provides new and particularly useful condensation products which are prepared by treating adducts of alpha,beta-ethylenically unsaturated aldehydes and derivatives of polyethylenic acids with an ester-type condensation catalyst, such as aluminum isopropoxide. The invention further provides valuable derivatives which may be prepared from the above-described condensation products.

It is an object of the invention to provide new and useful condensation products from adducts of unsaturated aldehydes and polyethylenic compounds. It is a further object to provide novel condensation products from adducts of alpha,beta-ethylenically unsaturated aldehydes and derivatives of polyethylenic acids. It is a further object to provide novel condensation products from the above-described adducts which possess many unexpected properties enabling the said products to be used for many important industrial applications. It is a further object to provide novel condensation products from the above-described adducts which possess superior air-drying properties. It is a further object to provide novel condensation products which are useful as plasticizers for natural and synthetic resins. It is a further object to provide valuable derivatives prepared from the above-described novel condensation products. It is a further object to provide a process for the preparation of the above-described novel condensation products and derivatives thereof. Other objects and advantages of the invention will be apparent from the following detailed description thereof.

It has now been discovered that new and particularly useful condensation products may be obtained by treating adducts of alpha,beta-ethylenically unsaturated aldehydes, such as acrolein, and derivatives of polyethylenic acids, preferably acids having at least two ethylenic linkages in conjugated relationship, with an ester-type condensation catalyst, such as aluminum isopropoxide, wherein the aldehyde groups present in the said adducts condense together to form an ester linkage. These novel condensation products have been found to possess many unexpected beneficial properties which enable the said products to be utilized for many important industrial applications described hereinafter.

The adducts utilized in the preparation of the novel condensation products comprise the reaction products of alpha,beta-ethylenically unsaturated aldehydes and derivatives of polyethylenic acids. As used throughout the specification and claims the expression "alpha,beta-ethylenically unsatured aldehydes" is meant to include all those aldehydes having a formyl group attached to an aliphatic carbon atom which in turn is joined through an ethylenic double bond to another aliphatic carbon atom. The remaining bonds of the aliphatic carbon atoms in the ethylenic linkage may be attached to saturated or unsaturated aliphatic, alicyclic or aromatic radicals, which in turn may be further substituted with non-interfering substituents, such as halogen atoms, ether radicals and the like. Examples of these aldehydes are acrolein, methacrolein, crotonaldehyde, cinnamaldehyde, 2-pentenal, 2,4-pentadienal, 2,5,7-octatrienal, 2-penten-1,5-dial, 4-phenyl-2-hexenal, 4-cyclohexyl-2-heptenal, 3-chlorophenyl-2,5-octadienal, 3-cyclo-pentenyl-2-hexenal, 1-cyclohexene-1-carboxaldehyde, 1-cyclopentene-1-carboxaldehyde, 3,4-dihydro-1,2-pyran-6-carboxaldehyde, 5,6 - dihydro-1,2-pyran-3-carboxaldehyde, 2,6 - dimethyl-5,6-dihydro-1,2-pyran - 3 - carboxaldehyde, and furfural.

Particularly preferred aldehydes are the alpha,beta - ethylenically unsaturated aliphatic aldehydes, preferably containing from 3 to 12 carbon atoms, such as acrolein, methacrolein, 2-pentenal, 2-hexenal, 2-methyl-2-pentenal, 3-butyl - 2 - butenal, 2-butenyl-2-pentenal, 3,5-diethyl-2-octenal, 2-dodecenal, and 4-propenyl-2,5-heptadienal.

The polyethylenic compounds utilized in the production of the adducts of the above-described unsaturated aldehydes comprise the derivatives of polyethylenic acids. As used throughout the specification and claims the expression "polyethylenic acid" is meant to include those organic acids possessing at least two ethylenic linkages, i. e. a double bond between two aliphatic carbon atoms, in their molecule. The ethylenic linkages may be contained in an open-chain or cyclic structure, and the free bonds of the aliphatic carbon atoms present in the said linkages may be attached to aliphatic, alicyclic or aromatic radicals which may be further substituted if desired with non-interfering substituents, such as halogen atoms, ether radicals, ester radicals, and the like. As described above the preferred polyethylenic acids are those having at least two of their ethylenic linkages in conjugated relationship, i. e. possessing the structure

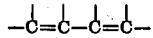

somewhere in the acid molecule. Examples of these acids are 5,7-decadienoic acid, 6,8,11-pentadecatrienoic acid, 7,9-dodecadienoic acid, 9,11-octadecadienoic acid, 5,7,9-octadecatrienoic acid, 5,7-octadecadienoic acid, 5,7-hexadecadienoic acid, 5,7,13,15-eicosatetrenoic acid, 1,3-cyclopentadienyl-4-pentanoic acid, 1,3-cyclohexadienyl-5-octanoic acid, 4,7-dichloro-9,11-octadecadienoic acid, 3-acetoxy-6,8-pentadecadienoic acid, rosin acids as abietic acid, 1-pimaric acid, and the like.

Derivatives of the polyethylenic acids used in producing the adducts of the unsaturated aldehydes are those obtained by replacing the hydrogen atom or hydroxyl group in the carboxyl group or carboxyl groups of the acids with suitable substituents, so as to form, for example, salts, amides, esters, and the like, of the said acids. Examples of such derivatives are sodium 5,7-decadienoate, potassium 6,8-11-pentadecatrienoate, sodium abietate, sodium pimarate, abietamide, ethyl alpha-elaeostearate, butyl beta-thioelaeostearate, butyl beta-elaeostearate, amyl icanate, methallyl 9,11-octadecadienoate, ethyl thio-abietate, cyclohexyl 5,7,9,12-octadecatetrenoate, phenyl 7,9-octadecadienoate, glycol bis(7,9-octadecadienoate), glycerol bis(elaeostearate), and glycerol 6,8,11-pentadecatrienoate.

Preferred derivatives to be reacted with the unsaturated aldehydes are the esters of polyethylenic acids having at least two of their ethylenic linkages in conjugated relationship and organic compounds containing esterifiable hydroxyl groups, such as methyl alcohol, ethyl alcohol, butyl alcohol, isoamyl alcohol, hexyl alcohol, methallyl alcohol, 2-butenol, 3,5-butanediol, cyclohexanol, phenol, benzyl alcohol, furfuryl alcohol, 2-pyridinemethanol, glycol, glycerol, mannitol, pentanediol, and the like. Examples of these derivatives are butyl beta-elaeostearate, octyl icanate, methallyl 9,11-octadecadienoate, cyclohexenyl 5,7-octadecadienoate, glycol bis(7,9-octadecadienoate), glycerol trielaeostearate, glycerol 6,8,11-pentadecatrienoate, methyl abietate, amyl abietate, and the like. Also included within this group are the oils (triglycerides) the acid residue of which contains the said polyethylenic acids, such as tung oil (China-wood oil), oiticica oil, po-yoak oil, neou oil, dehydrated castor oil, citicia oil, essang oil, and loafah oil. Oils containing only relatively small quantities of the above-described polyethylenic acids, such as linseed oil and soya bean oil, are less preferred but may be utilized.

Particularly preferred polyethylenic acid derivatives to be used in producing the adducts are the members of the group consisting of the esters of the open-chain polyethylenic acids containing at least 12 carbon atoms and aliphatic alcohols containing from 1 to 10 carbon atoms, esters of the rosin polyethylenic acids containing at least 12 carbon atoms and aliphatic alcohols containing from 1 to 10 carbon atoms, and drying oils the acid residue of which contains at least 30% of the open-chain polyethylenic acids containing at least 12 carbon atoms, the acids described in each of the foregoing members having at least two of the ethylenic linkages in conjugated relationship. Examples of this particularly preferred group of derivatives are tung oil, oiticica oil, po-yoak oil, methyl elaeostearate, butyl icanate, methallyl 9,11-octadecadienoate, glycol 7,9-octadecadienoate, octyl abietate, glycerol dielaeostearate, glycerol 6,8,11-pentadecatrienoate, and allyl 7,9-octadecadienoate.

The adducts of the unsaturated aldehydes and the derivatives of the polyethylenic acids may be prepared by any suitable method. They are preferably prepared by merely heating acid derivatives and the aldehydes together in a suitable container. No catalyst need be employed to effect this reaction, but if desired, substances such as toluene sulfonic acid, benzoic acid, hydrochloric acid, zinc chloride, stannic chloride, and the like in amounts varying from .1% to 5% by weight, may be utilized. The proportions of acid derivatives and aldehydes employed in the reaction may vary over a considerable range. The aldehydes are usually employed in excess as such compounds are normally quite volatile and more easily removed from the reaction mixture. Satisfactory results are obtained, however, when the reactants are employed in equal molar quantities or when an excess of the polyolefin is employed. Preferably, the acid derivative and the aldehyde are reacted in a molar ratio varying from 1.5:1 to 1:3, respectively.

The temperature employed in the reaction may also vary over a considerable range. In most cases, the temperature will vary from about 50° C. to about 300° C., with a preferred range varying from 70° C. to 200° C. Higher or lower temperatures may be employed, however, if desired or necessary. Atmospheric, superatmospheric, or subatmospheric pressures may be utilized.

The reaction may be accomplished in the presence or absence of diluents or solvents. If solvents are employed, it is preferred to utilize inert organic compounds, such as benzene, toluene, xylene, cyclohexanone, and mixtures thereof.

In some cases it may be desirable to effect the reaction in the presence of inhibitors such as hydroquinone, pyrogallol, beta-naphthol, diphenylamine, and the like. It also may be desirable in some cases to conduct the reaction in an inert atmosphere. By an inert atmosphere is meant one substantially devoid of molecular oxygen, such as nitrogen, helium, ethane and the like.

The adducts may be recovered from the reaction mixture by any suitable means, such as distillation, extraction, precipitation, and the like.

The novel condensation products are prepared from the above-described adducts by treating the said adducts with an ester-type condensation catalyst. As used throughout the specification and claims, the expression "ester-type condensation catalyst" is meant to include all those materials, such as aluminum isopropoxide which initiates a condensation of two aldehyde groups to form an ester linkage.

A single adduct may be treated with the ester-type condensation catalyst, or a mixture of two or more of the above-described adducts, such as a mixture of tung oil-acrolein adduct and methyl elaeostearate-methacrolein adduct, may be utilized.

Preferred ester-type condensation catalysts to be employed in the preparation of the condensation products comprise the lower alcoholates of the polyvalent metals in the second period of the periodic table of elements, such as aluminum lower alkoxides, such as aluminum butoxide, aluminum propoxide, aluminum pentoxide, aluminum hexoxide, aluminum ethoxide, and mixtures thereof. The catalysts may be employed per se or if desired may be employed in a solution with a solvent or diluent. The amount of the catalyst to be employed may vary over a considerable range. Generally, the amount may vary from 0.05% to 5% by weight of the reactants. Preferred amounts of catalyst vary from 0.1% to 4% by weight. It is usually desirable to utilize these catalysts in their anhydrous conditions.

The condensation of the aldehyde groups in the presence of the above-described catalysts usually takes place at a satisfactory rate at or near room temperature, but higher or lower temperatures may be utilized if desired or necessary. Preferred temperatures range from about 20° C. to about 40° C. Atmospheric, superatmospheric or subatmospheric pressures may be utilized.

The condensation may be accomplished in the presence or absence of solvents or diluents. If solvents are employed it is preferred to utilize inert organic compounds, such as benzene, toluene, xylene, carbon tetrachloride, and mixtures thereof.

The extent of the reaction at any time may be judged conveniently on the basis of the aldehyde content (which decreases as the reaction progresses) or on the ester content (which increases as the reaction progresses) as measured by the conventional methods. At the completion of the reaction the condensation products may be recovered by any suitable means, such as distillation, extraction, precipitation, and the like.

The condensation products of the invention possess many unusual properties which make them particularly valuable and useful in industry. The condensation products prepared from the adducts of the aldehydes and triglycerides of the polyethylenic acids, such as drying oils, for example, possess exceptionally fine air-drying properties and when films of these products are placed in air, with or without driers, they solidify in a matter of minutes, and in a short time form a hard, clear and insoluble coating. These products are particularly useful in the preparation of rapid air-drying coating compositions, such as paints, enamels, varnishes, lacquers, and the like. The condensation products, and particularly those prepared from the adducts of the simple esters of the polyethylenic acids are also valuable as plasticizers for synthetic and natural resins, such as the vinyl-type polymers as poly(vinyl chloride), poly(vinylidene chloride) and vinyl acetate, etc., and the cellulose derivatives as cellulose nitrate, cellulose acetate, cellulose acetobutyrate, and ethyl cellulose. The condensation products are also valuable as softening agents for casein and other protein plastics, lignin plastics, synthetic linear polyamides, phenol-aldehyde type resins, urea-aldehyde type resins, and the like. The condensation products, and particularly those prepared from the adducts of the salts of the polyethylenic acids, are valuable as resin stabilizers and as ingredients for drying agents for paints and enamels. The condensation products and especially those prepared from the adducts of the rosin esters may be used in the preparation of impregnating and laminating agents, textile sizing agents, and in the preparation of rigid plastic articles. The products are also of value as petroleum demulsifying agents, as vulcanization accelerators, rubber preservatives and softeners, resin modifiers, additives for dye preparations, silk delustering agents, solvents, textile lubricants, lubricating oil additives, asphalt adhesive agents, water-proofing agents for silica-gel greases, and as additives for insecticides and germicides, and in the preparation of tanning agents.

The novel condensation products may also be utilized as intermediates in the preparation of other useful and valuable derivatives. The condensation products prepared from the adducts of the unsaturated aldehydes and the partial esters of the polyethylenic acids, for example, will contain a plurality of free hydroxyl groups and may be further reacted with polycarboxylic acids to produce valuable alkyd-type resins. Examples of the polycarboxylic acids that may be combined with the novel condensation products in this manner are adipic acid, pimelic acid, suberic acid, sebacic acid, maleic acid, fumaric acid, glutaconic acid, hydromuconic acid, succinic acid, phthalic acid, tetrachlorophthalic acid, terephthalic acid, and trimellitic acid.

In addition, valuable products may be obtained from the novel condensation products, particularly those prepared from the unsaturated esters of the polyethylenic acids, by polymerizing the said products with themselves or with other polymerizable organic compounds, such as those containing at least one >C=C< group in their molecule, as maleic acid and maleic acid esters, ethylene and polyhalo-substituted ethylenes, and the like. Particularly preferred monomers to be copolymerized with the novel condensation products comprise the vinyl-type monomers, i. e., those compounds containing at least one $CH_2$=C< group in their molecule. Examples of the vinyl-type monomers are butadiene-1,3, 2,3-dimethylbutadiene-1,3, piperylene, isoprene, chloroprene, styrene, alpha-methylstyrene, dichlorostyrene, vinylnaphthalene, vinylphenol, alpha-methylacrylic acid, alpha-butylacrylic acid, methyl acrylate, butyl methacrylate, propyl ethacrylate, vinyl chloride, vinylidene chloride, acrylonitrile, methacrylonitrile, vinyl acetate, vinyl chloroacetate, vinyl benzoate, vinyl laurate, vinyl valerate, divinyl succinate, divinyl adipate, vinyl allyl phthalate, vinyl methallyl isophthalate, vinyl acrylate, vinyl crotonate, vinyl methacrylate, allyl acetate, allyl chloride, allyl alcohol, diallyl phthalate, vinyl butyl ether, vinyl ethyl ketone, and vinyl butyl ketone, and mixtures thereof.

The polymerization may be accomplished in bulk, in the presence of solvents or diluents, or in aqueous emulsion or suspension. Examples of solvents, that may be utilized in the polymerization, if desired, include hexane, benzene, butane, methyl ethyl ketone, and the like, and mixtures thereof.

The catalysts employed in the polymerization may be any of the known polymerization catalysts, such as persulfuric acid, peracetic acid, perphthalic acid, potassium persulfate, ammonium persulfate, sodium perborate, dibenzoyl peroxide, dilauroyl peroxide, benzoyl acetyl peroxide, diethyl peroxide, tertiary butyl hydroperoxide, hydrogen peroxide. In mose cases the amount of the catalyst will vary between 0.01% and 3% by weight of the material being polymerized. A preferred amount of catalyst will vary between 0.01% and 2% by weight.

The temperature employed in the polymerization will vary over a considerable range depending upon the type of catalyst employed, desired rate of polymerization, etc. In most cases the temperature will range between 60° C. and 200° C., with a preferred range between 60° C. and 150° C. If desired the polymerization may be conducted in the absence of oxygen i. e. under a blanket of an inert gas, such as carbon dioxide, methane, nitrogen, and the like.

The polymers of the addition products and/or their derivatives may be molded, etc. to produce resins having many improved properties. The resins may be cut, milled and machined to produce various articles of commerce. In the molten or solvent solution the resins may be utilized in the preparation of impregnating agents, laminating agents, and improved surface coating compositions, such as paints, enamels, and lacquer.

To illustrate the manner in which the invention may be carried out the following examples are cited. It should be understood, however, that the examples are for the purpose of illustration and should not be regarded as limiting the invention in any way.

Parts described below are parts by weight.

Example I

About 150 parts of tung oil, the acid residue of which contains from 85% to 90% elaeostearic acid, were mixed with about 50 parts of acrolein and a small quantity of hydroquinone and the resulting mixture heated in a stainless steel bomb at a tempearture between 170° C. and 190° C. for about 3 hours. At the completion of the reaction the unreacted acrolein was removed on a steam bath at a final pressure of 2 to 3 mm. The resulting addition product had a carbonyl value of 0.257 equiv./100 g. and iodine No. of 147 g./100 g. Wijs.

The tung oil-acrolein addition product produced above was added to carbon tetrachloride and the resulting solution treated at room temperature with 0.5% by weight of aluminum isopropoxide. Films of the resulting reaction product were solid within 2 to 3 minutes, and within an hour, with or without driers, were clear, hard and insoluble.

Example II

About 150 parts of tung oil were mixed with about 50 parts of methacrolein and a small quantity of hydroquinone and the resulting mixture heated between 70° C. and 190° C. In about three hours the reaction was stopped and the unreacted methacrolein removed on the steam bath at a final pressure of 2 to 3 mm. The resulting addition product had a carbonyl value of 0.204 equiv./100 g. and an iodine No. of 137 g./100 g. Wijs.

The tung oil-methacrolein adduct produced above was added to carbon tetrachloride and the resulting solution treated at room temperature with 0.5% by weight of aluminum isopropoxide. Films of the resulting reaction product were solid within a few minutes and within an hour were clear, hard and insoluble.

Example III

About 100 parts of oiticica oil were mixed with 40 parts of acrolein and the resulting mixture heated at about 100° C. At the completion of the reaction the unreacted aldehyde was removed on a steam bath at a final pressure of 2 to 3 mm. The addition product produced above was added to carbon tetrachloride and the resulting mixture treated with 1% by weight of aluminum butoxide. Films of the resulting reaction product were solid within a few minutes and within an hour formed a clear, hard and insoluble coating.

Example IV

About 90 parts of the methyl esters of tung oil fatty acids were mixed with about 50 parts of acrolein and a small quantity of hydroquinone and the resulting mixture heated in a stainless steel bomb at a temperature between 170° C. and 190° C. for about three hours. The reaction mixture was then distilled under reduced pressure to give a liquid addition product.

About 40 parts of the addition product produced above are mixed with carbon tetrachloride and treated at room temperature with about 1% by weight of aluminum isopropoxide. The resulting mixture is then distilled under reduced pressure to give a viscous liquid triester.

50 parts of the triester are mixed with 100 parts of poly(vinyl chloride) and 2 parts of a trade stabilizer and the mixture milled together at an elevated temperature. The composition is then rolled into sheets and allowed to cool at room temperature. The resulting composition has good heat stability, color and improved flexibility.

Example V

About 80 parts of methyl octadecadienoate are mixed with 50 parts of acrolein and a small quantity of hydroquinone and the resulting mixture heated between 80° C. and 175° C. At the completion of the reaction the mixture is distilled under reduced pressure to give a liquid addition product.

About 50 parts of the addition product produced above are dissolved in carbon tetrachloride and the resulting mixture treated at 30° C. with 1% by weight of aluminum butoxide. The mixture is distilled under reduced pressure to give a viscous liquid triester.

Poly(vinyl chloride) compositions plasticized with this triester have good flexibility and strength.

Example VI

About 75 parts of butyl licanate are mixed with 50 parts of crotonaldehyde and a small quantity of hydroquinone and the resulting mixture heated to a temperature between 70° C. and 190° C. At the completion of the reaction the mixture is distilled under reduced pressure to give the desired addition product.

Example VII

About 125 parts of methyl abietate and 65 parts of acrolein, inhibited with hydroquinone, were heated for 3 hours at 175° C. and acrolein removed on the steam bath under vacuum.

The methyl abietate-acrolein adduct produced above was then added to carbon tetrachloride and the resulting mixture treated with 0.5% by weight of aluminum isopropoxide. The mixture was distilled under reduced pressure to give a viscous liquid triester.

Poly(vinyl chloride) compositions plasticized with this triester have good flexibility and strength.

Example VIII

About 90 parts of anhydrous sodium elaeostearate are mixed with 50 parts of acrolein and the resulting mixture heated to a temperature between 160° C. and 190° C. At the completion of the reaction the unreacted acrolein is removed on the steam bath under vacuum.

The adduct produced above is then added to carbon tetrachloride and the resulting mixture treated with 0.5% by weight of aluminum isopropoxide. Evaporation of the solvent yields the liquid ester condensation product of the sodium elaeostearate-acrolein adduct.

*Example IX*

About 100 parts of tung oil are mixed with about 60 parts of 3,4-dihydro-1,2-pyran-6-carboxaldehyde and a small quantity of hydroquinone and the resulting mixture heated at a temperature between 80° C. and 190° C. When the reaction is complete the unreacted aldehyde is removed on a steam bath under vacuum.

The addition product produced above is added to carbon tetrachloride and the resulting mixture treated with 0.5% by weight of aluminum ethoxide. Films prepared from the resulting condensation product dry in air to form a hard, insoluble coating.

*Example X*

About 80 parts of the condensation product of the adduct of acrolein and the tung oil fatty acids produced in Example IV are mixed with 20 parts of methyl methacrylate and 5% benzoyl peroxide and the resulting mixture heated to 70° C. The resulting product is a hard, clear resin.

*Example XI*

About 60 parts of the condensation product of the adduct of acrolein and methyl octadecadienoate produced in Example V are mixed with 20 parts of acrylonitrile and 5% benzoyl peroxide and the resulting mixture heated to 65° C. to 75° C. The resulting product is a hard resin.

We claim as our invention:

1. An ester condensation product obtained by treating an addition product of acrolein and tung oil with from 0.01% to 5% by weight of aluminum isopropoxide.

2. An ester condensation product obtained by treating an addition product of acrolein and methyl esters of tung oil fatty acids with from 0.01% to 5% by weight of aluminum isopropoxide.

3. An ester condensation product obtained by treating an addition product of acrolein and methyl abietate with from 0.01% to 5% by weight of aluminum isopropoxide.

4. An ester condensation product obtained by treating an addition product of acrolein and sodium elaeostearate with from 0.01% to 5% by weight of aluminum isopropoxide.

5. An ester condensation product obtained by treating an addition product of an alpha,beta-ethylenically unsaturated aliphatic aldehyde containing from 3 to 12 carbon atoms and an ester of an aliphatic alcohol and an open-chain polyethylenic acid containing at least 12 carbon atoms and having at least two ethylenic linkages in conjugated relationship, with from 0.01% to 5% by weight of an aluminum lower alkoxide.

6. An ester condensation product obtained by treating an addition product of an alpha,beta-ethylenically unsaturated aliphatic aldehyde containing from 3 to 12 carbon atoms and a drying oil the acid residue of which contains at least 30% polyethylenic acids having at least two ethylenic linkages in conjugated relationship, with from 0.01% to 5% by weight of an aluminum lower alkoxide.

7. An ester condensation product obtained by treating an addition product of an alpha,beta-ethylenically unsaturated aliphatic aldehyde from 3 to 12 carbon atoms and an ester of an aliphatic alcohol and a rosin acid containing at least 12 carbon atoms and having at least two ethylenic linkages in conjugated relationship, with an aluminum lower alkoxide.

8. An ester condensation product obtained by treating an addition product of an alpha,beta-ethylenically unsaturated aldehyde and an acid derivative of the group consisting of salts, esters and amides of polyethylenic acids wherein the said acids possess at least two ethylenic linkages in conjugated relationship, with a condensation catalyst consisting of a lower alcoholate of a polyvalent metal in the second period of the periodic table of elements.

9. A process comprising treating an addition product of acrolein and tung oil with from 0.01% to 5% by weight of aluminum isopropoxide.

10. A process comprising treating an addition product of acrolein and the methyl ester of tung oil fatty acids with from 0.01% to 5% by weight of aluminum isopropoxide.

11. A process comprising treating an addition product of acrolein and methyl abietate with from 0.01% to 5% by weight of aluminum isopropoxide.

12. A process comprising treating an addition product of an alpha,beta-ethylenically unsaturated aliphatic aldehyde containing from 3 to 12 carbon atoms and an ester of an aliphatic alcohol and a polyethylenic acid containing at least 12 carbon atoms and having at least two ethylenic linkages in conjugated relationship, with from 0.01% to 5% by weight of an aluminum lower alkoxide.

13. A process comprising treating an addition product of an alpha,beta-ethylenically unsaturated aliphatic aldehyde containing from 3 to 12 carbon atoms and a drying oil the acid residue of which contains at least 30% polyethylenic acids having at least two ethylenic linkages in conjugated relationship, with an aluminum lower alkoxide.

14. A process comprising treating an addition product of an alpha,beta-ethylenically unsaturated aldehyde and an acid derivative of the group consisting of salts, esters and amides of polyethylenic acids wherein the said acids possess at least two ethylenic linkages in conjugated relationship with a condensation catalyst consisting of a lower alcoholate of a polyvalent metal in the second period of the periodic table of elements.

15. A polymer of the ester condensation product described in claim 1.

16. A polymer of the ester condensation product described in claim 2.

17. A polymer of the ester condensation product described in claim 7.

18. A polymer of the ester condensation product described in claim 8.

19. An ester condensation product as defined in claim 8 wherein the unsaturated aldehyde is acrolein.

20. An ester condensation product as defined in claim 8 wherein the polyethylenic acid derivative is tung oil.

21. A process as defined in claim 14 wherein the unsaturated aldehyde is acrolein.

22. A process as defined in claim 14 wherein the polyethylenic acid derivative is tung oil.

23. An ester condensation product obtained by treating an addition product of acrolein and oiticica oil with from 0.01% to 5% by weight of aluminum isopropoxide.

RICHARD R. WHETSTONE.
WILLIAM J. RAAB.
SEAVER A. BALLARD.

REFERENCES CITED

The following references are of record in the file of this patent:

UNITED STATES PATENTS

| Number | Name | Date |
|---|---|---|
| 1,785,166 | Young | Dec. 16, 1930 |
| 2,063,541 | Ellis | Dec. 8, 1936 |
| 2,188,890 | Clocker | Jan. 30, 1940 |
| 2,318,034 | Wayne | May 4, 1943 |